Jan. 9, 1923.
J. ROGLER.
LOCK NUT.
FILED MAR. 28, 1922.
1,441,714.
2 SHEETS—SHEET 1.
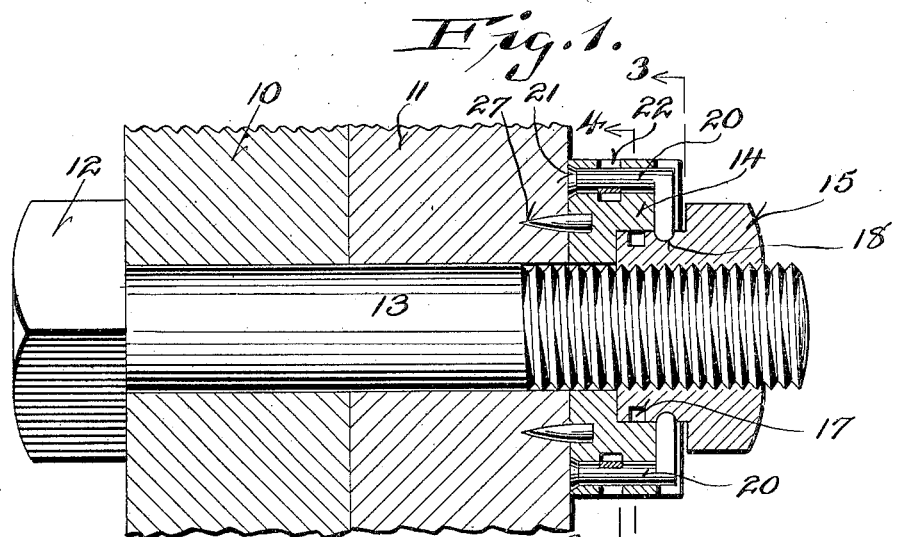
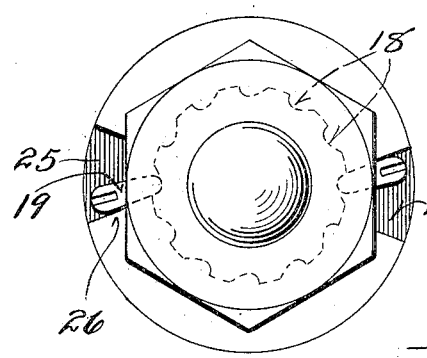
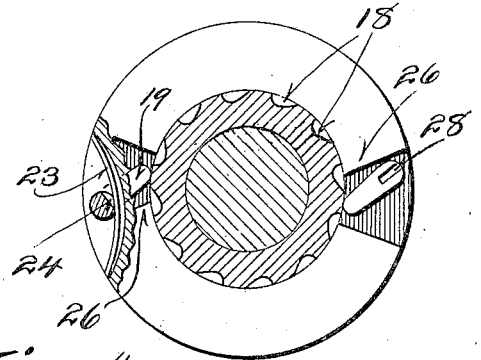
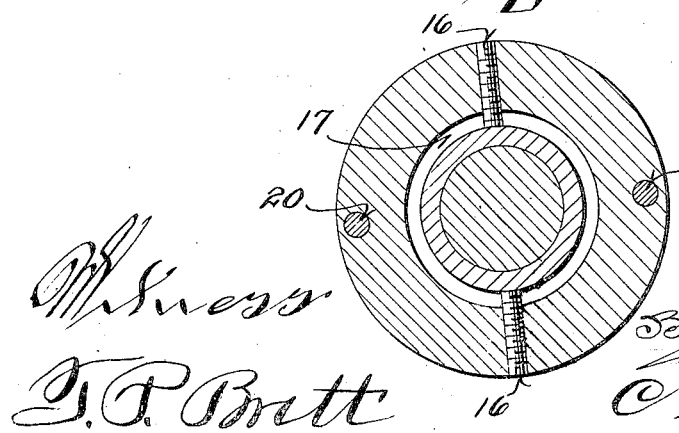
Inventor
John Rogler Jan. 9, 1923. 1,441,714.
J. ROGLER.
LOCK NUT.
FILED MAR. 28, 1922. 2 SHEETS—SHEET 2.
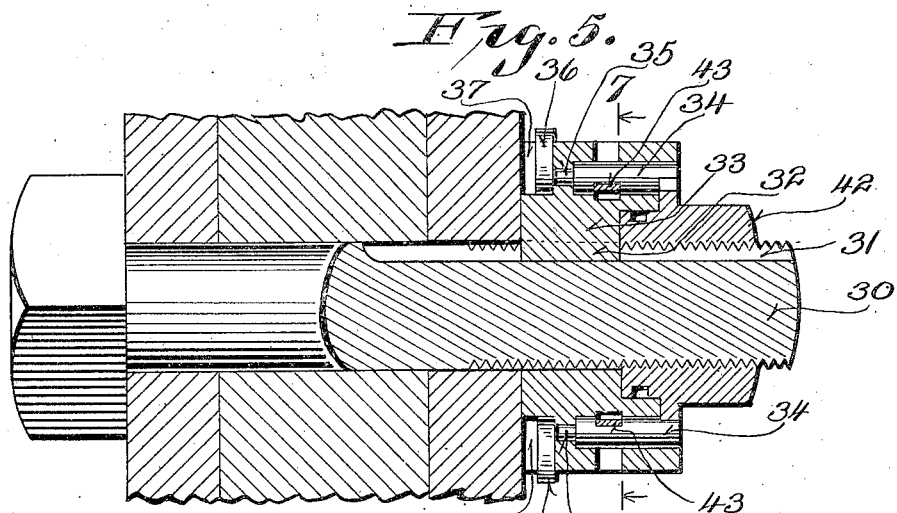
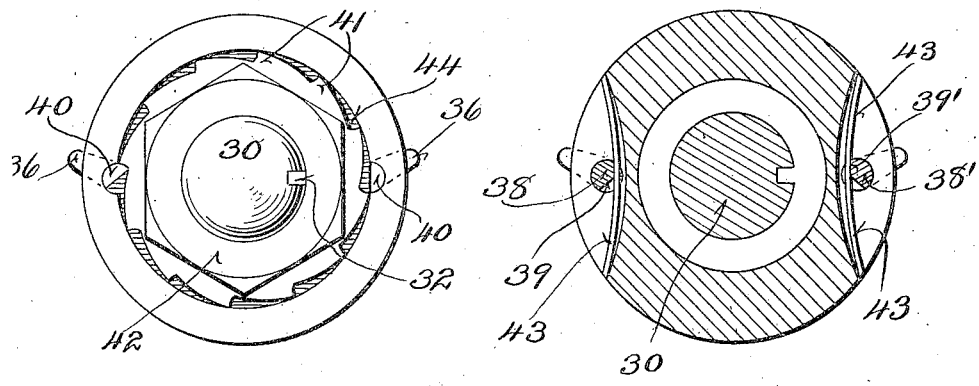
Inventor
John Rogler Patented Jan. 9, 1923.

1,441,714

UNITED STATES PATENT OFFICE.

JOHN ROGLER, OF JEFFERSON, WISCONSIN.

LOCK NUT.

Application filed March 28, 1922. Serial No. 547,388.

*To all whom it may concern:*

Be it known that I, JOHN ROGLER, a citizen of the United States, and resident of Jefferson, in the county of Jefferson and State of Wisconsin, have invented certain new and useful Improvements in Lock Nuts; and I do hereby declare that the following is a full, clear, and exact description thereof.

This invention relates to nut locks.

In the preferred modification a nut is provided, retained securely with a lock, the nut having an endless series of notches therein adapted to receive the ends of a pair of spring urged dogs. The nut is tightened by rotation on a bolt and drives the securing means on the lock into an object through which the bolt is directed. During the rotation of the nut, the pawls ride idly, but finally engage in the notches and prevent reverse rotation of the nut.

A primary object of the invention is the ease of operation of the device, the mere rotation of the nut operating to clamp it properly in position, the pawls and notches acting automatically, the spring moving the dog into the notches. There is no resistance to the clamping movement of the nut except that which is ordinarily encountered.

An object of the invention is the reliability of the device, which is retained in locking relationship despite vibration and shock. There is no tendency of the bolt to release. The action of the dogs is positive and strong and there is no danger of wear of parts in suchwise as to release the dogs. The lock is provided with gripping members preventing it from rotating with respect to the object with which it contacts so that all parts are maintained permanently in rigid locking relationship.

Another object of the invention is the ease of release of the lock. The pawls are provided with slots adapted to receive the ends of a screw driver, and on the rotation of the pawls the spring ceases to be operative to restore them to engaging position. Thus the pawl may be readily disengaged and the nut rotated to release the parts.

With the above and other objects in view, which will appear as the description proceeds, my invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which:

Figure 1 is a central sectional view of the lock in operative position, assembled with relation to a bolt and objects secured.

Figure 2 is an end elevation of the device.

Figures 3 and 4 are transverse sections on the lines 3—3 and 4—4, respectively, of Figure 1.

Figure 5 is a central, vertical section.

Figure 6 is an end elevation, and

Figure 7 is a transverse section on the line 7—7 of Figure 5.

In securing boards 10 and 11 together, the head 12 of bolt 13 is brought into contact with board 10 and lock 14 is positioned about the threaded end of the bolt. Nut 15 is threaded with relation to the bolt and is movable with respect to lock 14, but ordinarily inseparable therefrom because of the action of screws 16 directed through lock 14 and driven in recess 17. The nut is provided with an endless series of notches 18 adapted to receive a pair of oppositely disposed pawls 19 rotatable on spindles 20 secured with respect to lock 14 by heads 21. Lock 14 is provided with a pair of oppositely disposed recesses 22 receiving leaf springs 23, which are bowed and contact centrally with spindles 20. The spindles are cut away at 24 providing a flat surface for contact with the springs. Obviously, the tendency of the springs in contact with the flat surfaces is to retain the dogs directed inwardly.

Thus in tightening up nut 15 the pawls 19 ride over the surface of the nut, dropping into succeeding notches 18. The pawls are positioned in recesses 25 so that looking at them in the direction viewed in Figures 2 and 3, the pawls are free to rotate in a counter-clockwise direction. When, however, the nut is in its final or securing position, the pawls have the relation with nut 15 shown in Figure 2.

Shoulders 26 operate to prevent rotation of the pawls in a clockwise direction. Because of this dogging action, the nut is firmly secured in locked position. There is no possibility of the release of pawls 19 because the tendency of springs 23 is to retain them in engagement with the notches so that the nut may be subjected to considerable shock and vibration without possibility of its becoming detached.

In the assembly of the parts in the relationship shown in Figure 1, teeth 27 rigid with lock 14 are pressed into board 11, lock 14 being prevented from rotating and after lock 14 comes tightly in contact with board 11, the entire device, both nut and lock, are incapable of turning. Teeth 27 are illustrative of a general class of engaging devices which might be used to grip the sides of a piece of metal, or otherwise engage to an object to which the bolt is secured in such wise as to prevent the rotation of lock 14 and nut 15. In unlocking the nut a screw driver is inserted in slots 28 in pawls 19 and the ends of the pawls are removed from notches 18 so that the nut may be rotated. The rotation of nut 15 causes relative longitudinal movement between the nut and bolt 13 because of the threaded relationship therebetween. No longitudinal displacement occurs, however between the nut and the lock because of the operation of screws 16 riding in slot 17. Consequently when the rotation of nut 15 has progressed sufficiently, it and the lock are released from bolt 13.

In the modification of the device shown in Figures 5, 6, and 7, bolt 30 is provided with a slot 31 in which a key 32 rigid with lock 33 is free to slide, serving to prevent the rotation of the lock with respect to the bolt and thus performing a function similar to that of teeth 27. Lock 33 carries a pair of spindles 34 reduced at 35 and rigid with arms 36 directed outwardly from recesses 37 in lock 33. As shown in Figure 7, spindles 34 are provided with flat surfaces 38, 38' and 39, 39'. The end of spindles 34 is also cutaway to form a semi-cylindrical portion 40 adapted to engage with the endless series of teeth 41 on nut 42. The relationship of the semi-cylindrical portions 40 to surfaces 38, 38' and 39, 39' is such that when surface 39' is in contact with spring 43, semi-cylindrical portion 40, as shown in Figure 6, is swung out of engagement with teeth 41 so that the semi-cylindrical portion 40 does not operate to prevent the reverse rotation of the nut 42, the teeth 41 of which travel in a well 44 in lock 33, the surface of lock 33 immediately adjacent the well being circular and uninterrupted.

The parts are in this position when nut 42 is tightened upon bolt 30, key 32 sliding in slot 31 and preventing the rotation of lock 33 relative to bolt. After the parts have been assembled in proper securing position, arms 36 are manually moved until surface 38 comes in contact with spring 43. The relation of cylindrical portion 40 to surface 38 is such as shown in Figure 6. The portion 40 engages with one of the teeth 41 and prevents reverse rotation of nut 42. Thus the device is locked securely in position.

In this modification, also, springs 43 operate to exert through portions 40 a dogging action on teeth 41 so that there is no possibility of the release of the nut by reason of shock or vibration. By means of portions 40 lock 33 and nut 42 are secured against reverse rotatory movement with respect to each other and key 32 operates to prevent the rotation of both lock 33 and nut 42 relative to boat.

I claim:—

1. The combination of a threaded member, a nut threaded thereon and having an endless series of notches therein, a lock, a pawl engageable in said notches, a spindle rigid with said pawl rotatably mounted on said lock, said spindle having a flat and a rounded surface, and a spring contacting with said spindle and cooperating with said flat surface to retain said pawl in one of said notches.

2. The combination of a threaded member, a nut threaded thereon and having an endless series of notches therein, a lock, a pawl engageable in said notches, a spindle rigid with said pawl rotatably mounted on said lock, said spindle having a flat and a rounded surface, a spring contacting with said spindle and cooperating with said flat surface to retain said pawl in one of said notches, and means for preventing rotation of said lock.

In testimony that I claim the foregoing I have hereunto set my hand at Jefferson, in the county of Jefferson and State of Wisconsin.

JOHN ROGLER.